United States Patent [19]

Wagner

[11] 3,962,751
[45] June 15, 1976

[54] SCORING APPARATUS
[75] Inventor: Richard C. Wagner, Frankfort, Ill.
[73] Assignee: Hollymatic Corporation, Park Forest, Ill.
[22] Filed: Feb. 7, 1975
[21] Appl. No.: 547,863

[52] U.S. Cl. .................................................. 17/26
[51] Int. Cl.² .......................................... A22C 9/00
[58] Field of Search ............... 17/25, 26, 27, 28, 32; 100/155, 176

[56] References Cited
UNITED STATES PATENTS

| | | | |
|---|---|---|---|
| 1,991,439 | 2/1935 | Wood | 17/26 |
| 2,670,296 | 2/1954 | Tansley | 17/32 |
| 3,222,713 | 12/1965 | Stein et al | 17/26 |

Primary Examiner—Robert Peshock
Attorney, Agent, or Firm—Wegner, Stellman, McCord, Wiles & Wood

[57] ABSTRACT

Apparatus for scoring a food product patty with partial or complete perforations from either or both sides and comprising a scoring device having a plurality of generally circular blades arranged side-by-side with each blade comprising a plurality of spaced outwardly projecting teeth of a flexible solid plastic material so that interengaging teeth will yield without breaking. The disclosure also includes a drive for the blades between which the patty is drawn and which has the effect of evening out any unevenness of the patty.

8 Claims, 8 Drawing Figures

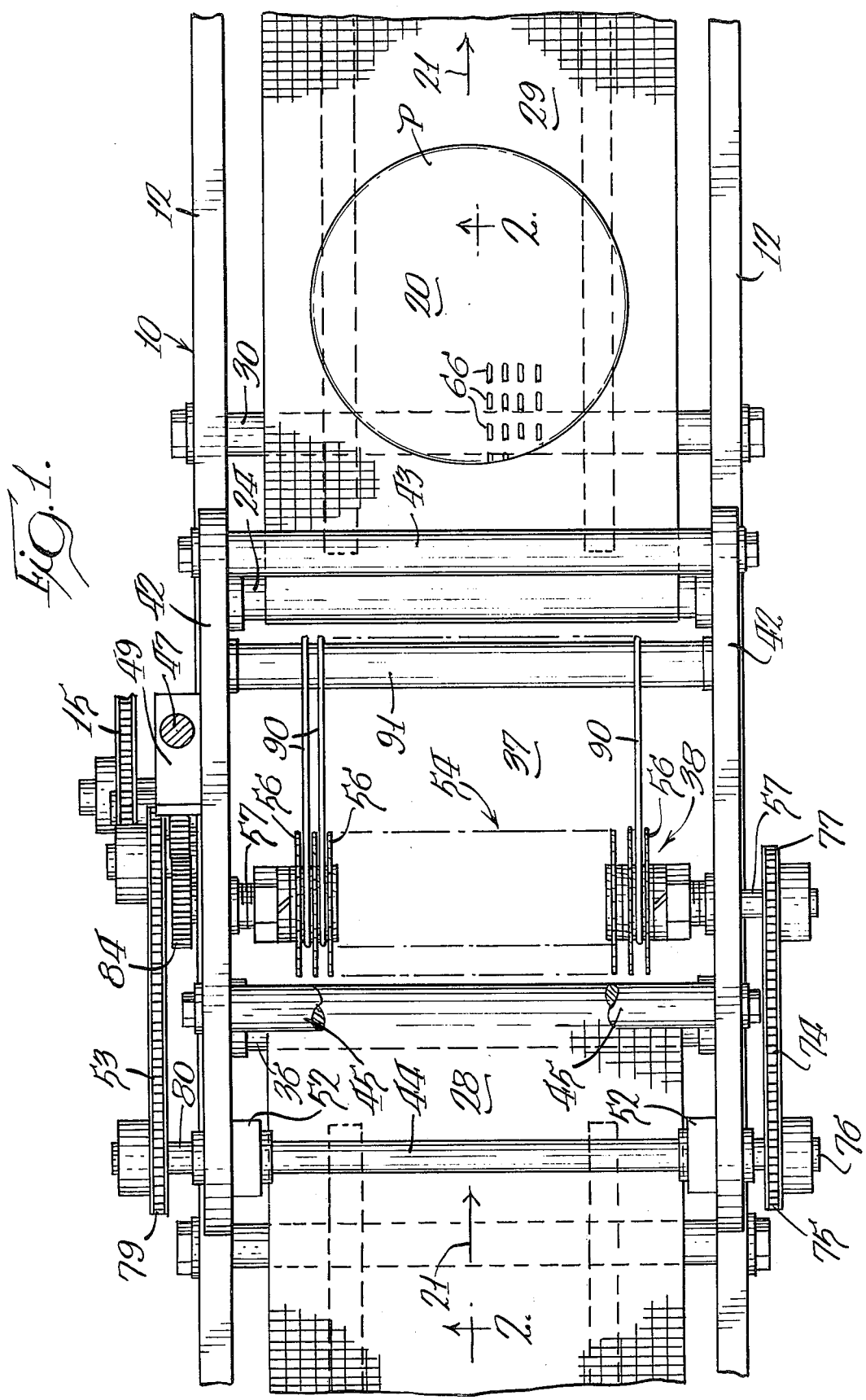

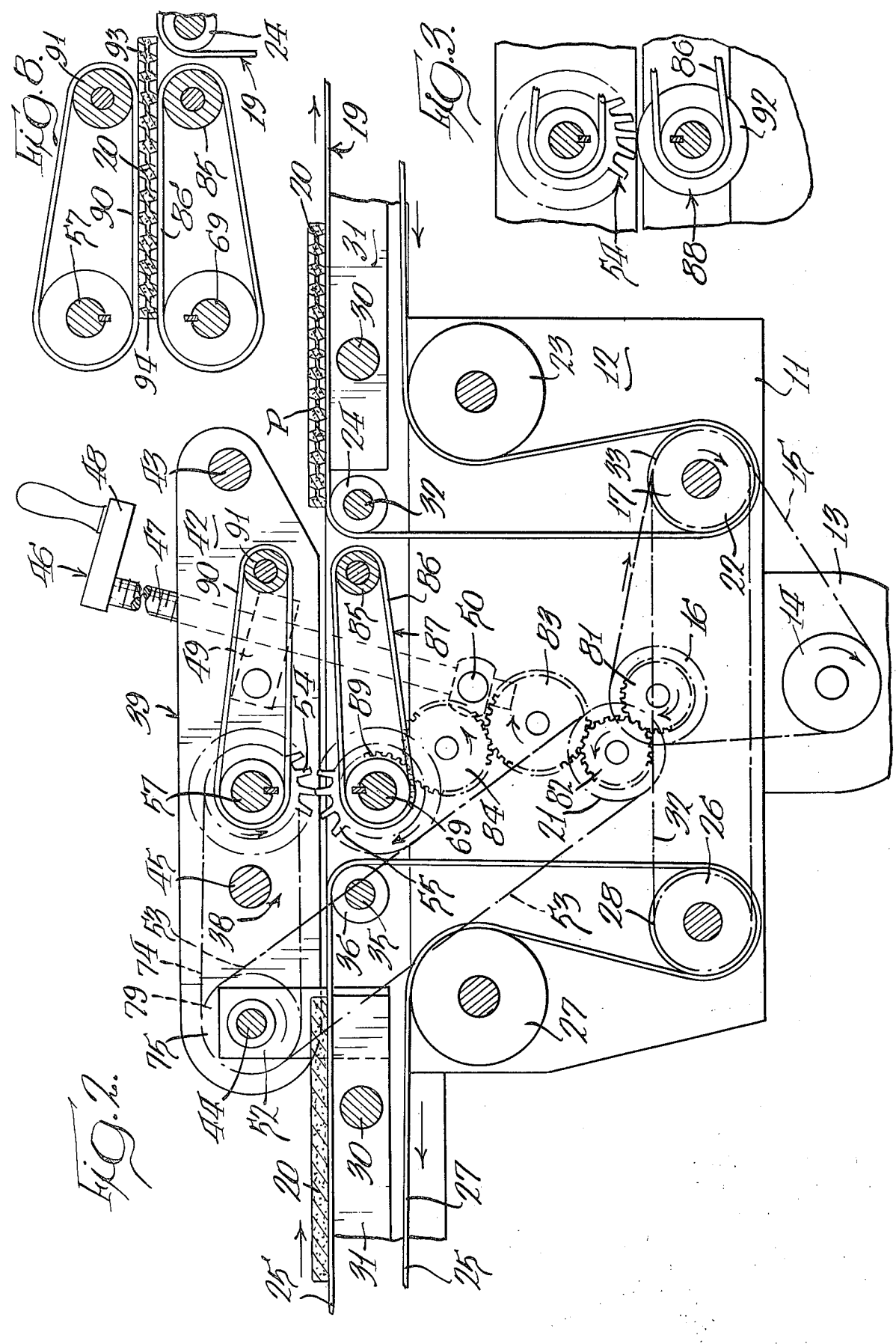

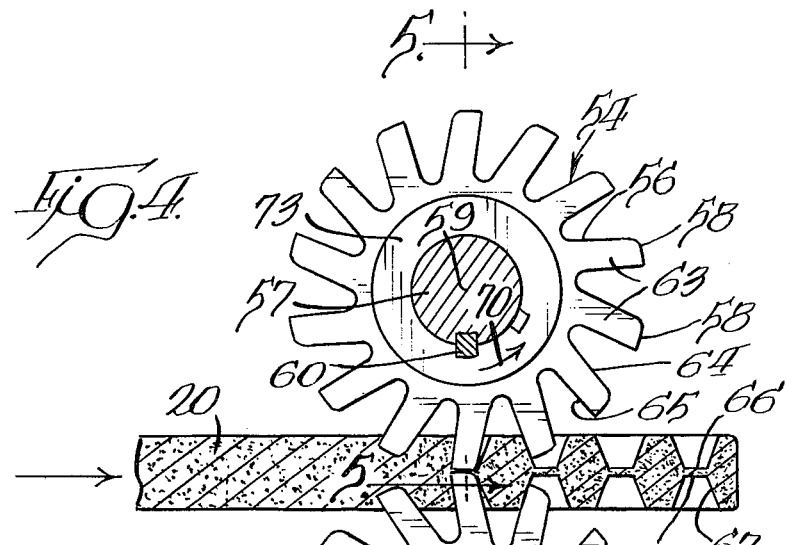
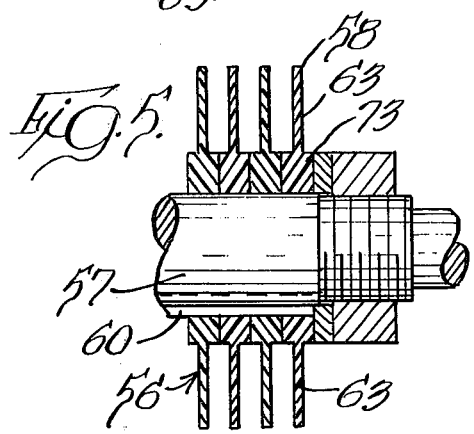
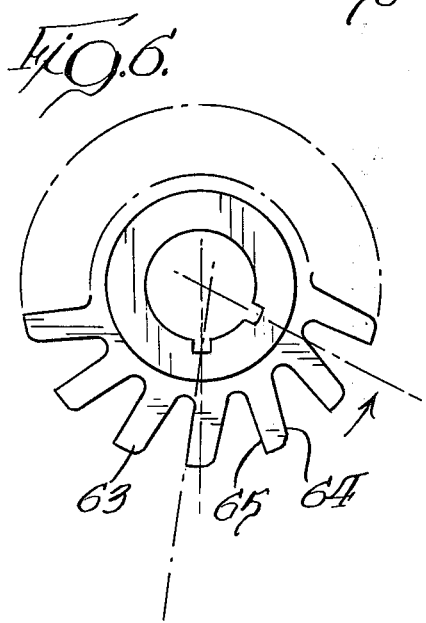
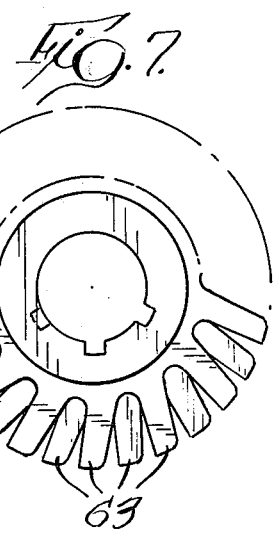

SCORING APPARATUS

BACKGROUND OF THE INVENTION

This invention relates to an apparatus for scoring a food product patty such as one of ground raw meat, fish or the like in which a conveyor is provided for moving the patty through a scoring station in a scoring device having flexible plastic teeth for penetrating the patty either completely or partially with the plastic material being yieldable on striking an obstruction such as a tooth on the opposite side without danger of breaking the tooth.

SUMMARY OF THE INVENTION

Scoring apparatus for scoring a food product patty such as a ground meat patty are well known and a good example of such is shown in Stein et al U.S. Pat. No. 3,222,713. The present invention is an improvement over these earlier ones because the scoring apparatus of this invention uses blades comprising teeth of a flexible plastic polymer material so that complete penetration of the patty may be achieved without danger of damage to the flexible plastic blades, as when striking an obstruction such as an opposite blade there is no damage but merely sideways deflection until the obstruction has been passed.

This resulting complete penetration of the patties is important in that the cooking time of these patties which are normally frozen after being perforated is reduced dramatically when compared to the cooking time of unperforated patties. Thus in one instance the cooking time for the frozen unperforated patties was almost 7½ minutes for a proper degree of cooking while with the same patties but perforated the cooking time was only slightly less than 4½ minutes. In some instances it has been found that food product patties as they emerge from the patty machine are of uneven thickness. The conveyor system of this invention has the additional advantage of pressing against the top of the patty in some embodiments and thereby leveling out the thickness to make it even throughout except of course for the identations caused by the scoring device.

The plastic material of the blades may be any solid inert plastic and typical plastic materials include polypropylene, polyethylene (especially high density), Delrin and the like. The plastic material is preferably one that is relatively non-adherent to animal material such as meat so that the perforating teeth of the blades enter and leave the patties smoothly and completely without excessively disturbing the surfaces. Delrin has been found to be an ideal plastic polymer for this purpose. This polymer is an acetal homopolymer also known as acetal resin. This solid acetal resin is unusual among thermoplastics in its resistance to organic solvents. It also has low moisture absorption and friction resistance.

BRIEF DESCRIPTION OF THE DRAWINGS

FIG. 1 is a plan view partially broken away and partially in section of a scoring apparatus embodying the invention.

FIG. 2 is a vertical sectional view taken substantially along line 2—2 of FIG. 1.

FIG. 3 is a fragmentary vertical sectional view illustrating another embodiment of the apparatus.

FIG. 4 is an enlarged fragmentary sectional view illustrating the scoring of a patty by scoring devices on opposite sides thereof.

FIG. 5 is a sectional view through one of the scoring devices taken substantially along line 5—5 of FIG. 4.

FIG. 6 is a side elevational view of one of the blades of a scoring device.

FIG. 7 is an end elevational view of an assembly of blades comprising one of the scoring devices.

FIG. 8 is a fragmentary side elevational view of another embodiment of the invention.

DESCRIPTION OF THE PREFERRED EMBODIMENTS

In the embodiment illustrated in the accompanying drawings the apparatus 10 for scoring a food product patty comprises a frame 11 having sides 12 between which extend a plurality of shafts.

On this frame there is mounted a motor 13 that drives a sprocket 14 for a drive chain 15. This drive chain 15 extends over first 16 and second 17 sprockets to rotate these sprockets in the direction indicated by the arrows.

The sprocket 17 drives a roller 18 for a conveyor belt 19 for transporting the patties 20 from center to right in FIG. 2. This conveyor belt 19 is endless and has a return reach extending over a roller 23 and then downwardly over a succeeding roller which is driven by the sprocket 17, then upwardly over another roller 24 and forwardly to become the patty conveying reach (FIG. 2).

At the entrance to the apparatus 10 there is provided a second conveyor belt 25 that is directed horizontally in alignment with the horizontal upper reach of the belt 19 and over the roller 36 and then down and under a roller 26 that is similar to an opposite roller 22 for the opposite belt 19 and then up and around another roller 27 that is similar to the opposite roller 23 and then rearwardly and then forwardly to pass over a return roller structure (not shown) in the same manner that the opposite belt 19 is returned. The second conveyor belt 25 is driven by a sprocket 28 mounted for rotation with the roller 26 and driven by a chain 32 that engages and is driven by a sprocket 33 that is aligned with the sprocket 17 that forms a part of the previously described motor drive.

Extending between the sides 12 of the apparatus are a plurality of supporting shaft 30 for mounting parallel horizontal support bars 31 for the belt 19.

Located at the scoring station 38 is a scoring unit 39 that comprises a pair of side plates 42 interconnected by tie rods 43 and 44. These plates 42 are generally arranged horizontally as shown in FIG. 2 and the rods 43 and 44 are located at the forward and rear ends, respectively, of the plates. In addition to these, there is also provided an intermediate tie rod 45 that is located closer to the rear rod 44 than to the front rod 43.

The rear tie rod 44 at the rear end of the side parallel plates 42 is also used as a hinged mounting for the scoring unit 39 so that the vertical position of the unit 39 and thus of the scoring device mounted thereon can be adjusted by an adjusting device 46. This adjusting device 46 in the embodiment illustrated comprises a threaded bolt 47 journalled at 50 and an upper handle 48 for rotation thereof and with the bolt 47 in the illustrated embodiment engaging a nut member 49 that is mounted on one of the side plates 42. By mounting the rear of the scoring unit 39 for vertically arcuate movement about the rear tie rod 44 which itself is mounted on the upper ends of hinge plates 52 the entire scoring unit 39 can be arcuately moved to adjusted position by rotating the handle 48 in the corresponding direction to raise or lower the unit 39. The hinge plates 52 are upwardly extending and parallel to each other and fixed to opposite sides 12 of the apparatus.

The tie rod 44 not only serves as a hinge rod for raising and lowering the unit 39 but also serves as a drive for the upper scoring device to be described hreinafter. Thus the rod 44 or more accurately axle 44 is rotated in a direction indicated by the arrow by a chain drive 53 which is itself driven by the sprocket 16 by engagement thereof with a sprocket 21.

In the embodiment illustrated there are a pair of scoring devices 54 and 55 at the scoring station 38. These are for scoring both sides of a patty 20 in the manner illustrated in FIG. 4. If desired, only one of the scoring devices may be used for scoring only one side of the patty by merely omitting the opposite scoring device. Thus if the patties 20 were to be scored on the top only the bottom device 55 could be omitted and the patty supported on the bottom by the customary separator paper sheet (not shown). Each scoring device 54 and 55 is constructed as shown in FIGS. 4–7. Thus each device comprises a plurality of generally circular blades 56 arranged side-by-side on an axle 57 and with the outer ends 58 arranged generally in a circle about an axis of rotation 59.

Each blade 56 is mounted on the axle 57 and keyed thereto for rotation with the axle by a key lock 60. Each blade 56 comprises a plurality of arcuately spaced outwardly projecting teeth 63 of a flexible plastic material as described above. Each tooth 63 has the blunt outer end 58 for perforating rather than cutting in this particular embodiment. However, plastics are available of which examples are given above which are strong enough so that these outer ends could be sharp if a cutting action was desired.

Each tooth 63 has a sloped leading edge 64 and a radial trailing edge 65 and corresponding teeth in the opposite blades 56 in the opposite scoring devices 54 and 55 are adapted to abut at the ends as illustrated in FIG. 4 so as to provide oppositely located perforations 66 and 67 in the patties 20 passing therebetween. The buttoms of corresponding sets of perforations 66 and 67 may be separated by a thin bridge 68 of meat whose thickness can be easily regulated by adjusting the vertical position of the upper scoring unit 39 relative to the lower device 55 which is fixed in position by having its axle 69 rotatable mounted on the fixed side plates 12. This thickness of the meat bridge 68 can therefore be as thin as desired and, in fact, may be nonexistent so that the facing perforations 66 and 67 cooperate to provide an opening completely through the patty 20 if desired. Because of the plastic nature of the teeth 63 any contact of the cooperating blades are illustrated in FIG. 4 will not damage the blades as they will merely flex out of the way and then spring back to their original position when they have been moved further by the rotation 70 of the blades.

Thus the plastic teeth 63 of this invention permit moving the opposite blades 56 in the opposite scoring devices 54 and 55 so close together that there is physical contact between the blade ends 58 as illustrated. This not only permits complete penetration without breakage of the flexible blade but also provides automatic yielding or flexuring of contacting blades so that it is not critical that the exact spacing be maintained and it will also take care of the tolerance variations of the diameter of the blades 56.

In a typical blade structure where the blade and especially the knives were made of a plastic material such as the above-described Delrin each tooth 63 has a width between the edges 64 and 65 of about 3/16 inch and a thickness illustrated by the cross section of FIG. 5 of about 0.12 inch. The teeth 63 extend outwardly from a hub 73 that is thicker than the teeth themselves as shown in FIG. 5 with a typical thickness of the hub being about 0.273 inch. With this arrangement the hubs 73 can be arranged side-by-side in contacting series on the axle 57 to provide the desired spacing of, for example, 0.152 inch between adjacent teeth.

In the preferred construction, as illustrated in FIG. 7, the series of blades 56 are each arranged at a small arcuate angle to the next blade so that the teeth 63 of successive blades 56 are arcuately staggered.

In order to rotate the upper scoring device 54 comprising the assembly of blades 56 as described there is provided a chain 74 that engages a sprocket 75 on the one end 76 of the tie rod axle 44 and engages another sprocket 77 in the corresponding end of the axle 57 of the upper scoring device 54. This axle 57 extends through the adjacent side plate 42 and is journalled in the opposite side plate 42 as shown at the top of FIG. 2.

The bottom scoring device 55 is rotated from the sprocket 16 which itself is driven by the drive from the motor 13 through a gear train that comprises a gear 81 rotatable with the sprocket 16 and meshing with a succeeding gear 82 which in turn meshes with a gear 83 which meshes with a gear 84 which meshes with a gear 89 that is mounted on the shaft 69 on which the lower scoring device 55 is mounted. With this arrangement the upper and lower scoring devices 54 and 55 are rotated in the directions of the arrows in FIG. 2 to cooperate with the successive patties 20 passing therebetween.

The space between the lower scoring device 55 and the beginning of the successive horizontal reach of the conveyor belt 19 is bridged by O-ring belts 86 passing over a forward belt 19. Each narrow belt 86 is located between a pair of adjacent scoring blades 56 on the bottom device 55 so that the hubs 73 thereof cooperating with each other act as pulleys and spacers for the narrow belts 86. Thus the series of belts 86 which extend across the full width of the scoring devices are driven from the scoring device axle 69 with the result that a patty 20 shown at the left in FIG. 2 is conveyed between the scoring devices or adjacent a device when only one is used and from there to the narrow belts 86 and then onto the horizontal reach 29 of the conveyor 19. This results in the successive patties 20 being conveyed through the machine by positive engagement of the conveyor 19 and the belts 86 making up the intermediate conveyor 87. These belts 86 as well as an upper set of similar belts 90 driven by the chain 74 and passing over a roller 91 also serve to prevent a patty 20 from clinging to and being carried around by the rotating blades 56.

FIG. 3 illustrates a second embodiment of the apparatus where the patties are scored only on the top by a single scoring device 54 and with the bottoms of the patties being supported by a roller having successive grooves for engagement of the narrow belts 86 comprising the intermediate conveyor 87 in the manner previously described.

It sometimes occurs that the patties 20 as they emerge from the patty forming machine (not shown) as indicated by the direction arrow 21 of FIGS. 1 and 2 are of uneven thickness and this is sometimes particularly pronounced in either the leading 93 or trailing 94 edges. In those instances the patty will be leveled out perfectly as in the embodiment of FIG. 8 by the belts 86 and 90 being spaced apart a distance equal to the desired thickness of the patty 20. Because the food material such as the ground raw meat in the patties is plastic and deformable the parallel belts 86 and 90 bearing on the top and bottom surfaces of the patties results in patties of the desired uniform thickness throughout equal to the spacing of these belts.

Having described my invention as related to the embodiments shown in the accompanying drawings, it is my intention that the invention be not limited by any of the details of description, unless otherwise specified, but rather be construed broadly within irs spirit and scope as set out in the appended claims.

I claim:

1. Apparatus for scoring a patty of ground raw meat, comprising: conveyor means for moving the patty in a path through a scoring station; a scoring device at said scoring station comprising a plurality of generally circular blades arranged side-by-side along an axis of rotation that extends generally transversely to said path, each blade comprising a plurality of spaced outwardly projecting teeth of a flexible plastic polymer capable of sideways deflection without material damage to the teeth upon striking an obstruction, said teeth having blunt outer ends substantially describing a circle; and means for rotating said scoring device for scoring the surface of a patty carried by said conveyor means through said scoring station, each said blade having its said teeth spaced from and angularly staggered with respect to the teeth in the next adjacent blade.

2. The apparatus of claim 1 wherein there are provided a pair of said scoring devices vertically spaced, one said device being above said path for scoring the top of a said patty and the other said device beneath said path for scoring the bottom of a said patty.

3. The apparatus of claim 1 wherein the teeth on each blade have blunt ends arranged to pass adjacent to the ends of corresponding teeth on the opposite set of blades.

4. Apparatus for scoring a patty of ground raw meat, comprising: conveyor means for moving the patty in a path through a scoring station; a pair of scoring devices vertically spaced, one said device being above said path for scoring the top of a said patty and the other said device beneath said path for scoring the bottom of a said patty, each said scoring device comprising a plurality of generally circular blades arranges side-by-side along an axis of rotation that extends generally transversely to said path, each blade comprising a plurality of spaced outwardly projecting teeth of a flexible plastic polymer capable of sideways deflection without material damage to the teeth upon striking an obstruction, said teeth having blunt outer ends substantially describing a circle; means for rotating each said scoring device for scoring the surface of a patty carried by said conveyor means through said scoring station; and means for arranging corresponding teeth in corresponding blades of said pair of spaced scoring devices in successive linear alignment during operation of said apparatus.

5. Apparatus for scoring a patty of ground raw meat, comprising: conveyor means for moving the patty in a path through a scoring station; a scoring device at said scoring station comprising a plurality of generally circular blades arranged side-by-side along an axis of rotation that extends generally transversely to said path, each blade comprising a plurality of spaced outwardly projecting teeth of a flexible plastic polymer capable of sideways deflection without material damage to the teeth upon striking an obstruction, said teeth having blunt outer ends substantially describing a circle, each blade comprising a plastic hub and integral said teeth projecting therefrom with the hubs of successive blades being thicker than said teeth and abutting each other to comprise spacers for spacing the teeth of successive blades from each other; and means for rotating said scoring device for scoring the surface of a patty carried by said conveyor means through said scoring station.

6. The apparatus of claim 5 wherein the teeth on each blade have blunt ends arranged to pass adjacent to the ends of corresponding teeth on the opposite set of blades, said plastic polymer being relatively nonadherent to meat.

7. The apparatus of claim 5 wherein said means for rotating said scoring devices comprise flexible drive members engaging each said device and having substantially parallel cooperating reaches extending from said devices and spaced apart a distance substantially equal to the thickness of a patty for evening out any unevenness in thickness of the patty.

8. The apparatus of claim 7 wherein said flexible drive members comprise a plurality of drive belts each interleaved between adjacent blades.

* * * * *